Sept. 4, 1962 F. WITZMANN 3,052,325
DEVICE FOR PREVENTING THE SWERVING OF MOTOR VEHICLES
Filed Feb. 2, 1960 2 Sheets-Sheet 1
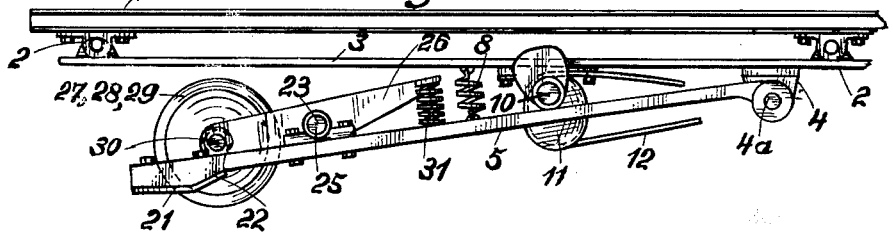
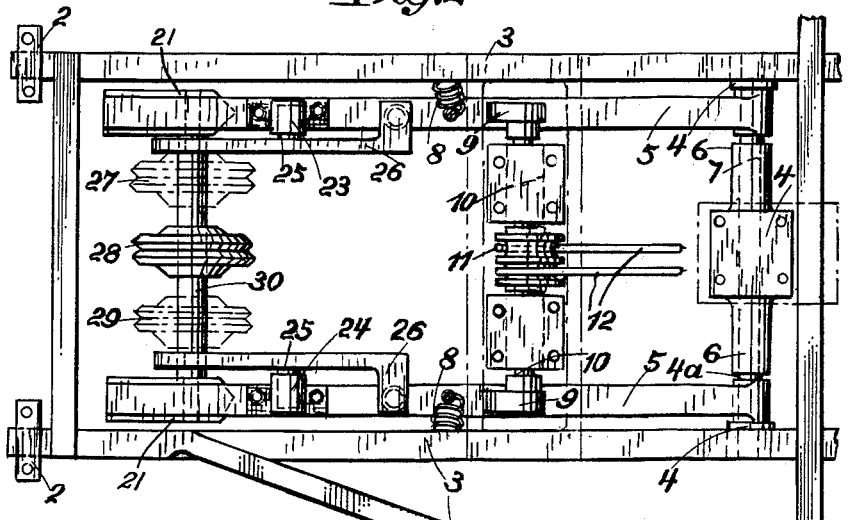
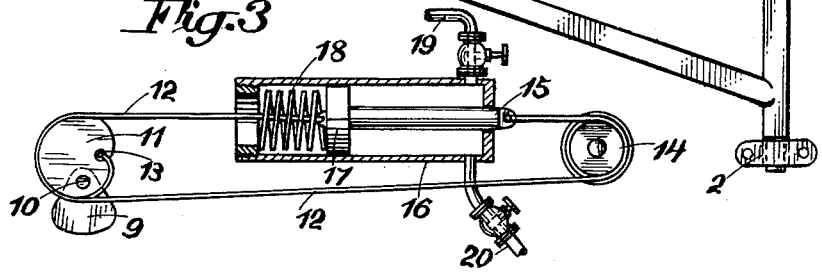
INVENTOR.
Franz Witzmann
BY Michael S. Striker Sept. 4, 1962  F. WITZMANN  3,052,325
DEVICE FOR PREVENTING THE SWERVING OF MOTOR VEHICLES
Filed Feb. 2, 1960  2 Sheets-Sheet 2
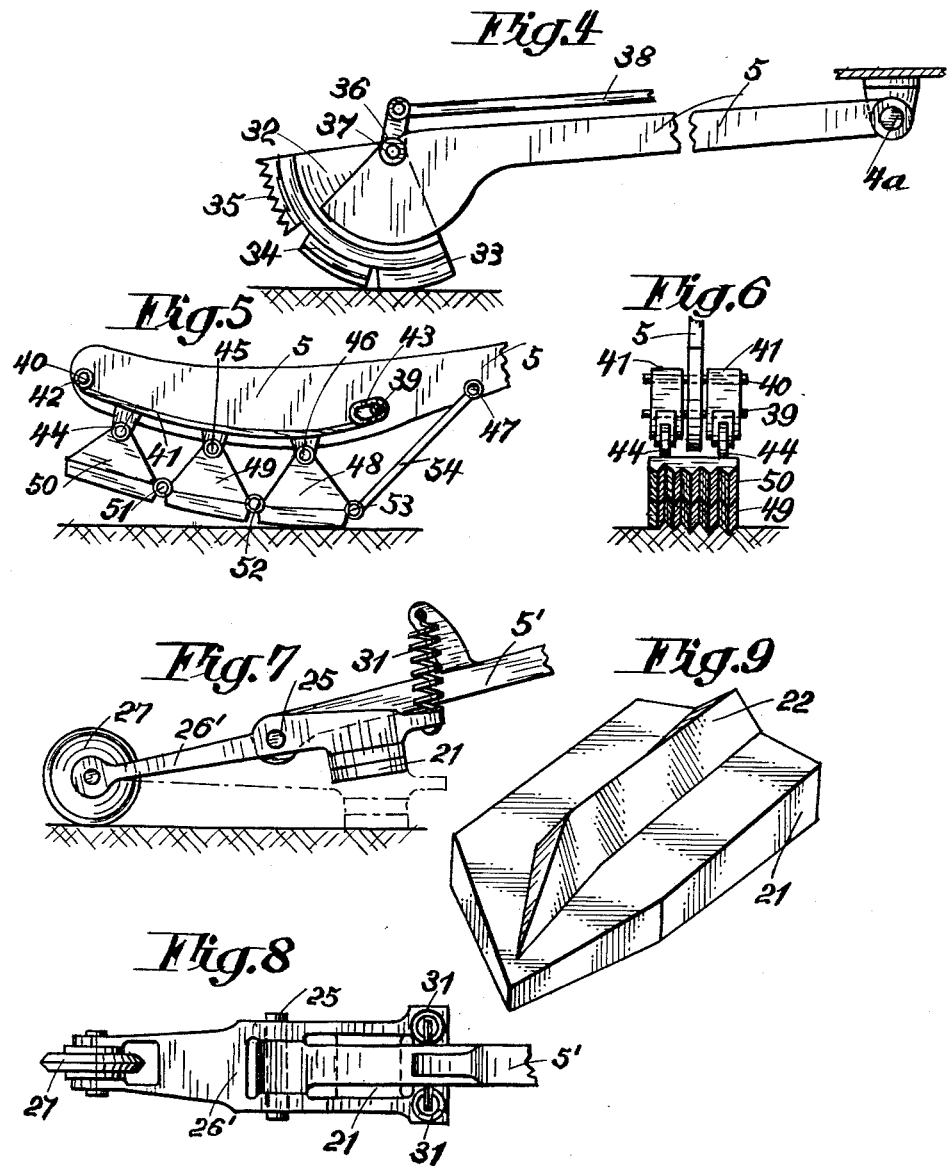

United States Patent Office 3,052,325
Patented Sept. 4, 1962

3,052,325
DEVICE FOR PREVENTING THE SWERVING
OF MOTOR VEHICLES
Franz Witzmann, Obersteinergasse 7, Vienna, Austria
Filed Feb. 2, 1960, Ser. No. 6,306
Claims priority, application Austria Feb. 4, 1959
5 Claims. (Cl. 188—5)

Devices for preventing the swerving of motor vehicles are known. In such devices the rolling members are disposed in a central longitudinal plane and are mounted on the vehicle frame by means of a jib arm so that they can be lowered and can be forced against the roadway by means of a pressure device which acts on the jib arm and can be, e.g., hydraulically controlled from the driver's seat. Most of the previously known devices of this type for preventing swerving do not meet the requirements to be fulfilled, if they are simple in construction, whereas such devices of complicated construction can be applied only to vehicles which have been specially designed for this purpose.

Besides, most of the known devices for preventing swerving use a rolling member in the shape of a roll which engages the roadway with a more or less wide surface and which is driven by the vehicle to serve as a propulsion aid and as a braking means. Such rolling members have not proved satisfactory, on the one hand, because they involve a disproportionately large structural expenditure and, on the other hand, they fail to afford protection against swerving because as rolling members they create a highly excessive resistance to travel, whereas as a brake they cannot act quickly enough in an emergency.

To overcome these disadvantages of prior art devices, applicant has invented a device for preventing swerving which basically comprises two elements, one of which can be used to prevent swerving without reducing the speed of travel, whereas the other can be used at the instant of a suddenly occurring danger as an additional braking aid of energetic action, both elements being capable to be controlled by an element to which pressure is applied and in such a manner that they become effective on the roadway in chronological succession.

According to the invention this idea is realized in that a brake jaw and at least one resiliently yieldable mounted rolling member having a rough tread surface formed, e.g., with a cutting edge or teeth, can be lowered against the roadway under pressure by means of a common lever or two separate levers, the rolling member protruding by a certain distance beyond the underside of the brake jaw in the direction towards the roadway and solely engages the roadway under pressure, to prevent swerving, when the pressure lever is lowered to a first active position, whereas it engages the roadway together with the brake jaw only when the lever pressure is increased and the lever is lowered to a second active position. In lighter vehicles a pressure lever disposed in the central longitudinal plane of the vehicle and carrying rolling members mounted on both sides of its free end will be sufficient. In vehicles of medium and heavy weight at least one pair of such pressure levers will be mounted, according to a further development of the invention, on a bearing frame for vertical pivotal movement and their front lever arms carrying a rigid brake jaw also carry in a resiliently yieldably manner a rigid shaft on which several rolling members are mounted for free and mutually independent rotation so as to protrude with a portion of their periphery a certain distance beyond the underside of the jaw.

Such a pressure lever or pair of pressure levers are mounted with their pivots and all control and pressure elements on a carrying frame, which according to the invention is easily detachably mounted on the chassis of the respective vehicle.

Several embodiments of a device for preventing the swerving of motor vehicles are shown by way of example in the accompanying drawings. FIGS. 1 and 2 show the first illustrative embodiment in a side view and top plan view, respectively. The associated hydraulic pressure control is shown in FIG. 3. FIG. 4 illustrates another design of the brake jaw and FIGS. 5 and 6 show a composite brake jaw in side and end views, respectively. FIGS. 7 and 8 illustrate another embodiment of the device in a side view and top plan view, respectively. FIG. 9 is a perspective view showing a brake jaw viewed from the tread side.

This device for preventing swerving comprises a frame 3, which may be of trapezoidal shape and which can be attached to the underside of a chassis 1 of a motor vehicle by means of several fastening clips 2 whenever required. This frame comprises three bearing bodies 4. The intermediate bearing body 4 provides a pivot 4a for the two pressure levers 5 and has a bearing sleeve 6, which protrudes in opposite axial directions from the intermediate bearing body 4 and in which the shaft 7, firmly connected to the pressure levers 5, is rotatably mounted. Each of these pressure levers 5 is held in its raised position by a spring 8 connected at opposite ends to the lever 5 and the frame 3, respectively, and levers 5 can be lowered towards the roadway by cams or eccentrics 9 against the action of these springs 8. In the embodiment shown these cams 9 are mounted on the frame 3 for rotation about a shaft 10 and press either directly on the pressure levers 5 or on rollers mounted on the pressure levers.

The shaft 10 which is common to the two cams 9 is turnably mounted in the remaining two bearing bodies 4 and carries intermediate these bearing bodies a camlike rope pulley 11 firmly connected to the shaft. A traction rope 12 is affixed at 13 (FIG. 3) to the periphery of the pulley. This cam pulley 11 serves to vary the leverage in such a manner that the force acting on the pressure lever will increase in proportion with the deflection of the lever. The rope 12 extends from its fixing point once around the camlike pulley 11 in opposite peripheral directions and the end of a rope portion extending around a guide roller 14 is connected to the piston rod 15 of a hydraulic cylinder 16 while the other end is connected to the piston 17 to be moved thereby during reciprocation of the piston 17. The pressure cylinder 16 in which piston 17 is mounted for reciprocation is connected to a supply conduit 19 and a drain conduit 20 of a pressure liquid circuit known per se, including a pump, and can be operated when required by means of a control (not shown), which is actuable from the driver's seat. A compression spring 18 located between piston 17 and one end of cylinder 16 acts against the pressure fluid introduced in the other end of cylinder 16.

In this embodiment each of the two pressure levers 5 has at its end a brake jaw 21 rigidly mounted thereon. According to FIG. 9 this brake jaw has on its underside a longitudinal tooth 22, which will penetrate into the roadway, which may be, e.g., ice-covered, when the pressure levers 5 are lowered by means of the cams 9 against the action of the springs 8. Having wedge-shaped front ends these brake jaws will immediately penetrate into the snow or ice.

At points spaced from the pressure jaws 21 the pressure levers 5 have bearings 23 affixed thereto, in which two pivot pins 25 of two vertically pivotally movable levers 26 are mounted, which pins are aligned along a common axis. The front arms of the levers 26 are connected by a shaft 30, which carries one or several freely rotatable rolling members, e.g., three of such members 27, 28, 29. To mount the rolling members 27, 28, 29 resiliently yieldably on the pressure levers 5, the levers 26 are either made from strong leaf springs or they carry springs 31, which act on the second arms of the levers 26 to cause the rolling members 27, 28, 29 to protrude by a certain distance below the brake jaws 21 so that the lowering of the pressure levers 5 will cause the rolling members 27, 28, 29 to engage the roadway before the brake jaws 21. The roller member or members 27, 28, 29 are rotatably mounted on the shaft 30 and will therefore run mutually independently. Rolling members of rubber or a suitable plastic material are used for wet roads or roads whicch are moist from fog. The rolling members 27, 28, 29 used in winter have two or more annular peripheral ccutting edges, which when the pressure levers 5 are lowered, will penetrate into the roadway to provide inherently a safeguard against a lateral slipping of the vehicle. Alternatively the rolling members 27, 28, 29 may be set with teeth. It is important that the cutting edges of the rolling members penetrate into the ice or snow on the roadway to such a depth that any danger of swerving of the vehicle is reliably avoided.

The hydraulic control of the pressure levers 5 enables the driver in the case of danger of swerving to lower the pressure levers 5 from a retracted position by means of the cams 9 to a first active position to cause the rolling member or members to engage the roadway under pressure. If this safeguard against swerving should not be sufficient when a sudden brake application is required the two pressure levers 5 will be lowered to a second active position in which the brake jaws 21 engage the roadway under the pressure of the cams 9. For this reason the pressure can be increased by means of the hydraulic device 11–20 to such an extent that the vehicle is partly lifted from the roadway. In that case a substantial part of the weight of the vehicle rests on the brake jaws 21 and is used to ensure a good braking action.

It is also possible to arrange the brake jaw for adjustment, in order to vary or increase the braking action, and to provide it according to FIG. 4 with segments arranged in series in the peripheral direction of a sector 32 and having different friction characteristics. For instance, the segment 33 may be formed of knurled rubber, the segment 34 of iron or another hard material and with a surface which is rough, e.g., ribbed, and the segment 35 of steel and with very coarse teeth. The sector 32 has an eye 36 with which it is mounted for pivotal movement on the pivot pin 37 at the end of the pressure lever 5 and can be tilted by means of a linkage 38, so that the segment cannot only be adjusted to three different positions but can also be locked by known means with the aid of the linkage.

The brake jaw for a single pressure lever 5 may also be formed, e.g., as is shown in FIGS. 5 and 6, to increase the braking area in proportion with the increase in pressure. In this case the pressure lever 5 is provided on one side or on both sides of its free end with two spaced bearing pins 39, 40 which protrude at right angles from the sides of the lever and serve each to mount a strong horizontally extending spring leaf 41 or spring set, which has an eye 42 mounted on the rear bearing pin 40 (considered in the direction of travel) and a slotlike eye 43 mounted on the front bearing pin 39 (also considered in the direction of travel) and, e.g., three downwardly protruding pivot eye lugs 44, 45, 46. Each pair of the pivot eye lugs of both spring leaves 41 carries one of the brake jaws 48, 49, 50 and these brake jaws are interconnected by hinges 51, 52 to form a string of jaws, which extends in the longitudinal direction of the levers and the first hinge 53 of which is tension- and compression-resistingly connected by means of a pair of links 54 to a pin 47 of the pressure lever 5. The spring leaf 41 has a curvature which rises from the pin 39. As a result the forward brake jaw 48, considered in the direction of travel, will reach the roadway first when the pressure lever is being lowered. Owing to the curvature of the spring leaves only an increased lever pressure will cause the intermediate pressure jaw 49 and the last pressure jaw 50, considered in the direction of travel, successively to engage the roadway in addition to the first brake jaw 48 so that an increasing lever pressure will substantially increase the braking surface. All three brake jaws 48, 49, 50 may be made from the same material and provided with the same brake lining. To increase the braking action, however, it is recommendable to provide the second and third brake jaws 49, 50 with a lining of increased roughness and to form them from a harder material than the first brake jaw 48.

Another embodiment of the invention is diagrammatically shown in FIGS. 7 and 8. In this case the two-armed lever 26′, which is pivoted at the end of a pressure lever 5′, has unequal arms. The long arm of the lever mounts a rolling member and the short arm of this lever has a brake jaw affixed thereto, which is lifted from the roadway by means of a spring 31. The spring 31 is held by the pressure lever and presses the rolling member 27 against the roadway when the pressure lever 5′ is lowered. For this reason a lowering of the pressure lever 5′ will first cause only the rolling member 27 to engage the roadway under pressure. When the bearing pressure of the rolling member 27 is then increased by the pressure lever 5′ the two-armed lever 26′ of the rolling member is pivotally moved against the action of its spring 31 by the rolling member 27 already engaging the roadway so that the previously inoperative brake jaw 21 is also swung down from its raised position onto the roadway. The leverage causes the pressure exerted by the pressure lever 5′ on the lever shaft 25 to be mainly transmitted to the pressure jaw 21 so that its braking action is increased.

It is emphasized that further modifications relating to the brake jaw itself, the rolling members and the pressure levers are possible within the scope of the invention.

For instance, it may be desirable, as shown in FIG. 9, to provide the brake jaw with a single middle rib and with pressure faces which slightly rise outwardly from the two flanks of said ribs and from the rear to the front to provide pressure faces which are extremely effective on snow-covered roads and are prevented from slipping laterally by the central longitudinal rib.

Another important feature of the invention resides in that rolling members having tread surfaces of different hardness or form may be selectively mounted on the pressure lever.

In another variant of the invention the rolling member and the brake jaw are mounted each on a pressure lever and both pressure levers are held by springs in the elevated position and each of them can be independently forced against the roadway by one of two cams, which can be mechanically, electromagnetically or hydraulically controlled from the driver's seat. Alternatively, the pressure levers may be arranged for successive operation in the range of movement of one cam.

I claim:

1. A skid-preventing device for motor vehicles comprising, in combination, a support adapted to be attached to the bottom of a motor vehicle frame;

lever means mounted at one end thereof on said support pivotable between a retracted position in which the other end of said lever means is adjacent said support and distant from a road surface on which the vehicle is driven, a first active position and a second active position in which the other end of said lever means is closer to the road surface than in said first active position;

brake means mounted on said other end of said lever means and having a braking surface adapted to engage the road surface when said lever means is in said second active position;

a rolling member having a V-shaped cross section;

mounting means for mounting said rolling member on said lever means in the region of said other end of the latter movable in upward direction from a lowered position in which a peripheral portion of said rolling member extends a distance downwardly beyond said braking surface of said brake means which is substantially equal to the distance of the braking surface from the road surface when said lever means is in said first active position so that said peripheral portion is adapted to engage the road surface when said lever means is in said first active position;

resilient means operatively connected to said lever means and said mounting means and tending to keep said rolling member in said lowered position;

and operating means mounted on said support and operatively connected to said lever means for pivoting the latter from said retracted to said active positions, whereby during this movement said rolling member will engage the road surface with gradually increasing pressure before said braking means engages the road surface.

2. A skid-preventing device for motor vehicles comprising, in combination, a support adapted to be attached to the bottom of a motor vehicle frame;

lever means mounted at one end thereof on said support pivotable between a retracted position in which the other end of said lever means is adjacent said support and distant from a road surface on which the vehicle is driven, a first active position and a second active position in which the other end of said lever means is closer to the road surface than in said first active position;

first resilient means operatively connected to said support and said lever means and tending to keep said lever means in said retracted position;

brake means mounted on said other end of said lever means and having a braking surface adapted to engage the road surface when said lever means is in said second active position;

a rolling member having a V-shaped cross section;

mounting means for mounting said rolling member on said lever means in the region of said other end of the latter movable in upward direction from a lowered position in which a peripheral portion of said rolling member extends a distance downwardly beyond said braking surface of said brake means which is substantially equal to the distance of the braking surface from the road surface when said lever means in is said first active position so that said peripheral portion is adapted to engage the road surface when said lever means is in said first active position;

second resilient means operatively connected to said lever means and said mounting means and tending to keep said rolling member in said lowered position;

and operating means mounted on said support and operatively connected to said lever means for pivoting the latter from said retracted to said active positions, whereby during this movement said rolling member will engage the road surface with gradually increasing pressure before said braking means engages the road surface.

3. A skid-preventing device for motor vehicles comprising, in combination, a support adapted to be attached to the bottom of a motor vehicle frame;

lever means mounted at one end thereof on said support pivotable between a retracted position in which the other end of said lever means is adjacent said support and distant from a road surface on which the vehicle is driven, a first active position and a second active position in which the other end of said lever means is closer to the road surface than in said first active position;

brake means mounted on said other end of said lever means and having a braking surface adapted to engage the road surface when said lever means is in said second active position;

a rolling member having a V-shaped cross section;

mounting means for mounting said rolling member on said lever means in the region of said other end of the latter movable in upward direction from a lowered position in which a peripheral portion of said rolling member extends a distance downwardly beyond said braking surface of said brake means which is substantially equal to the distance of the braking surface from the road surface when said lever means is in said first active position so that said peripheral portion is adapted to engage the road surface when said lever means is in said first active position, said mounting means including at least one lever pivotally mounted intermediate the ends thereof on said lever means and turnably supporting on one end thereof adjacent said other end of said lever means said rolling member;

spring means operatively connected to said lever means and to the other end of said lever and tending to keep said rolling member in said lowered position;

and operating means mounted on said support and operatively connected to said lever means for pivoting the latter from said retracted to said active positions, whereby during this movement said rolling member will engage the road surface with gradually increasing pressure before said braking means engages the road surface.

4. A skid-preventing device for motor vehicles comprising, in combination, a support adapted to be attached to the bottom of a motor vehicle frame;

lever means mounted at one end thereof on said support pivotable between a retracted position in which the other end of said lever means is adjacent said support and distant from a road surface on which the vehicle is driven, a first active position and a second active position in which the other end of said lever means is closer to the road surface than in said first active position;

brake means mounted on said other end of said lever means and having a braking surface adapted to engage the road surface when said lever means is in said second active position;

a rolling member having a V-shaped cross section;

mounting means for mounting said rolling member on said lever means in the region of said other end of the latter movable in upward direction from a lowered position in which a peripheral portion of said rolling member extends a distance downwardly beyond said braking surface of said brake means which is substantially equal to the distance of the braking surface from the road surface when said lever means is in said first active position so that said peripheral portion is adapted to engage the road surface when said lever means is in said first active position;

resilient means operatively connected to said lever means and said mounting means and tending to keep said rolling member in said lowered position;

and operating means mounted on said support and operatively connected to said lever means for pivoting the latter from said retracted to said active positions, said actuating means engaging said lever means at a portion thereof distant from said one end thereof for applying pressure to said portion of said lever means increasing with the pivoting of said lever means from said retracted to said active positions, whereby during this movement said rolling member will engage the road surface with gradually increasing pressure before said braking means engages the road surface.

5. A skid-preventing device for motor vehicles comprising, in combination, a support adapted to be attached to the bottom of a motor vehicle frame;

lever means mounted at one end thereof on said support pivotable between a retracted position in which the other end of said lever means is adjacent said support and distant from a road surface on which the vehicle is driven, a first active position and a second active position in which the other end of said lever means is closer to the road surface than in said first active position;

brake means mounted on said other end of said lever means and having a braking surface adapted to engage the road surface when said lever means is in said second active position;

a rolling member having a V-shaped cross section;

mounting means for mounting said rolling member on said lever means in the region of said other end of the latter movable in upward direction from a lowered position in which a peripheral portion of said rolling member extends a distance downwardly beyond said braking surface of said brake means which is substantially equal to the distance of the braking surface from the road surface when said lever means is in said first active position so that said peripheral portion is adapted to engage the road surface when said lever means is in said first active position;

resilient means operatively connected to said lever means and said mounting means and tending to keep said rolling member in said lowered position;

and operating means mounted on said support and operatively connected to said lever means for pivoting the latter from said retracted to said active positions, said operating means including a cam turnably mounted on said support and having a camming portion engaging a portion of said lever means distant from said one end thereof, a hydraulic cylinder, a piston reciprocable in said cylinder, means for feeding pressure fluid into said cylinder to one side of said piston so as to move said piston in one direction, and transmission means between said piston and said cam for turning said cam, during movement of said piston in said one direction, in a direction in which said cam moves said lever means from said retracted to said active positions and with a turning moment increasing during turning of said cam in said direction, whereby during this movement said rolling member will engage the road surface with gradually increasing pressure before said braking means engages the road surface.

References Cited in the file of this patent

UNITED STATES PATENTS

| | | |
|---|---|---|
| 1,187,752 | Lown | June 20, 1916 |
| 1,219,073 | Brewer | Mar. 13, 1917 |
| 2,168,440 | Dole | Aug. 8, 1939 |